Dec. 11, 1928.
R. D. LENTZ
1,694,421
AUTOMATICALLY OPERATING MECHANISM FOR ELEVATING LIQUIDS
Filed Jan. 12, 1927
2 Sheets-Sheet 1

INVENTOR.
Rea D. Lentz,
BY
Lawrence S. Paddock
ATTORNEY.

Dec. 11, 1928.

R. D. LENTZ 1,694,421

AUTOMATICALLY OPERATING MECHANISM FOR ELEVATING LIQUIDS

Filed Jan. 12, 1927    2 Sheets-Sheet 2

INVENTOR.
Rea D. Lentz,
BY Laurence S. Paddock
ATTORNEY

Patented Dec. 11, 1928.

1,694,421

UNITED STATES PATENT OFFICE.

REA D. LENTZ, OF LOS ANGELES, CALIFORNIA, ASSIGNOR OF ONE-FOURTH TO RALPH MITCHELL, OF LOS ANGELES, CALIFORNIA.

AUTOMATICALLY-OPERATING MECHANISM FOR ELEVATING LIQUIDS.

Application filed January 12, 1927. Serial No. 160,593.

This invention relates to an apparatus for elevating liquids from a lower level to a higher level, and has particular usefulness when applied to a condition wherein it is desirable to elevate a liquid over the top of an elevation in the surface of the earth.

An object of my invention is to provide an apparatus capable of elevating water or other liquids to a higher level, by the utilization of the fall of a body of water or other liquid in successive steps and to accomplish this object in an automatic and continuous manner without assistance from outside sources of power.

A further object of my invention is to provide an apparatus which will intermittently produce a vacuum or condition of rarefied air pressure in a series of closed receptacles situated one above the other, and utilize said vacuum or condition of rarefied air pressure to cause a liquid to be elevated successively into and from said closed receptacle to the desired height, and then be employed in whole or in part in the vacuum producing elements of the apparatus.

It is also an object of my invention to provide a means whereby the liquid may be discharged from said closed receptacles into separate open receptacles by the action of gravity and elevated from said open receptacles into succeeding higher closed receptacles in a simultaneous manner.

It is also an object of my invention to produce said vacuum or condition of rarefied air pressure in an intermittent manner by means of a series of separate vacuum producing elements.

A further object is to automatically control the operation of the vacuum producing elements by mechanism responsive to the liquid level in one of said series of vacuum producing elements.

A further object is to provide connections between the controlling elements of the series of vacuum producing elements and the liquid level responsive device in one of said vacuum producing elements which will cause corresponding functions to take place simultaneously in all of the vacuum producing elements.

Further objects will appear hereinafter in the following detailed description:

Fig. 3 is an enlarged sectional view of two of the vacuum producing elements.

Figure 1:
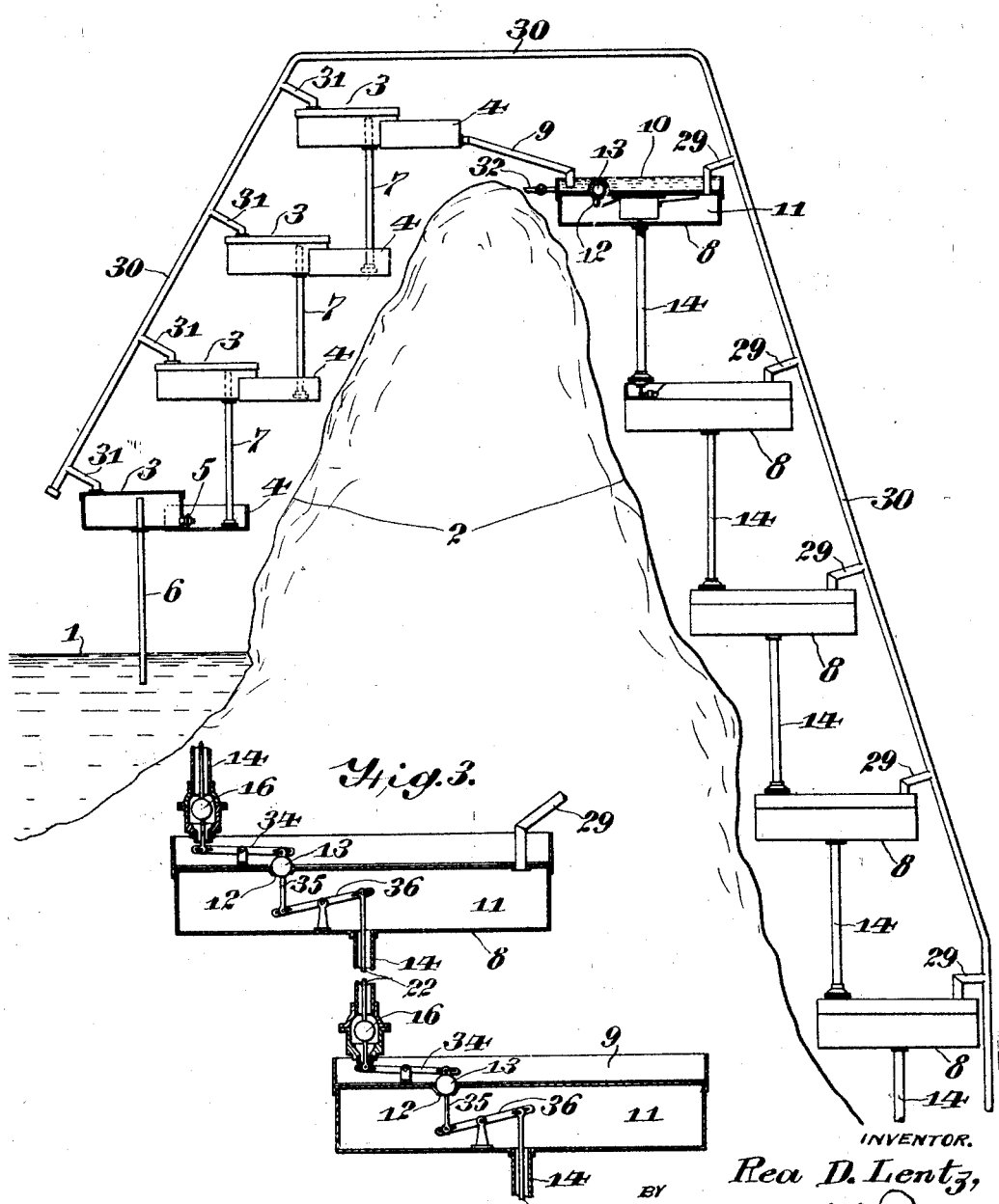
Fig. 1 is a side elevation of my liquid elevating apparatus shown in position to elevate a liquid over a mountain.

In the drawings 1 is a source of liquid which it is desired to elevate over a mountain 2. A series of superimposed ascending receptacles 3 is located above the liquid 1, each of which is provided with an extended open receptacle 4, having communication with the closed receptacle 3 through a check valve 5 which opens outwardly from the closed receptacle 3 and is situated near the bottom thereof so that liquid in receptacle 3 will flow by gravity into the open receptacle 4. The lowest receptacle 3, is provided with a standpipe 6, which extends from a point within the receptacle 3, near the top thereof down into the liquid 1. Remaining receptacles 3 are provided with standpipes 7 which extend from a point within the same near the top thereof down into the liquid contained in the adjacent lower open receptacle 4. The capacity of the open receptacles 4 and design of the apparatus is such that there remains a sufficient quantity of liquid in the receptacles 4 to at all times submerge the ends of the standpipes 7. The highest open receptacle 4 is connected with an open receptacle located at the top of the highest vacuum producing element 8 of a series of such vacuum producing elements by a pipe 9.

The vacuum producing elements 8 comprise open, upper receptacles 10, which communicate with lower closed receptacles 11, through valve controlled inlets 12, in which are located valves 13. The bottom of each of the closed receptacles 11 is provided with an outlet pipe 14. An outlet valve cage 15 is located at the bottom of each of the pipes 14 and has an outlet valve 16 therein. In order to produce the required vacuum within the closed receptacles 11, I first fill them with liquid and then permit the liquid to discharge through the pipes 14, at this time the valves 13 will be closed and the valves 16 open. Following this operation, the valves 16 will be closed and the valves 13 open, at which time the liquid from the open receptacles 10 will flow into the receptacles 11, and substantially fill the same together with the pipes 14.

I have provided an automatically operating mechanism for the purpose of operating the valves 13 and 16 which is responsive to the liquid level in the chamber 11 of the top unit. This mechanism includes a separate receptacle or float chamber 17, located within the receptacle 11, which has an inlet 18 and outlet at 19 which is provided with a check valve 20 opening outwardly from the chamber 17. The chamber 17 is provided with a stand pipe 21 which extends from the bottom of the chamber 17 upwardly to a point near the top thereof. The receptacle or chamber 17 is cup-shaped and is attached to the bottom of the open receptacle 10. The valve 16 is attached to a rod 22 which is provided with a cap 23 on the upper end thereof. The rod 22 passes through the stand pipe 21 to a point above the same and the cap 23 is fastened to the outer end of the rod 22. A float 24 is located in the chamber 17 and is slidably mounted on the stand pipe 21. The float 24 is provided with a projection 25 which comes in contact with the cap 23 attached to the rod 22 when the float rises within the chamber 17 to a sufficient height for this purpose. A pivoted lever 26 is linked at one end to the float 24 and its other end extends beneath the valve 13, so as to come in contact with a projection thereon and raise the same to open position. Attached to the chamber 17 is a sloping channel 27, having an inlet 28 at its upper end in close proximity to the top of the receptacle 11. The inlet 18 in the wall of the chamber 17 opens into the channel 27 at a point near the bottom thereof.

Each of the receptacles 11 is connected at the top thereof by branch pipes 29 with a common vacuum pipe 30; the vacuum pipe 30 extends over the mountain 2 and is connected with the tops of the closed receptacles 3, by branch pipes 31. A valve controlled outlet 32 is provided for the highest open receptacle 10, through which liquid can be discharged to storage at the top of the mountain 2. This stored liquid can be subsequently used at a lower level for power or other purposes.

The rod 22 to which the valve 16 is attached, extends on past the valve 16 through a bushing 33. The outer end of the rod 22 is pivotally attached to a pivoted lever 34 at one end thereof, while the other end of the lever 34 is pivotally attached to the valve 13 in the next lower receptacle 10. This latter valve 13 has a rod 35 attached thereto which is pivotally attached at its outer end to another pivoted lever 36 at one end thereof, while the other end of the lever 36 is pivotally attached to the rod 22, extending through the outlet pipe 14 of the closed receptacle 11. The levers 34 and 36 are mounted upon suitable brackets attached to the bottoms of the receptacles 10 and 11 respectively. The latter mentioned rod 22 extends on through the pipe 14 and is pivotally attached at the outer end thereof to the lever 34 of the succeeding lower vacuum producing element 8, which together with the succeeding similar valve operating mechanism and valves of the succeeding lower vacuum producing elements 8 are connected for simultaneous operation. The final outlet pipe 14 may discharge to storage or to any point where it is desired to utilize the discharged liquid.

Figure 2:
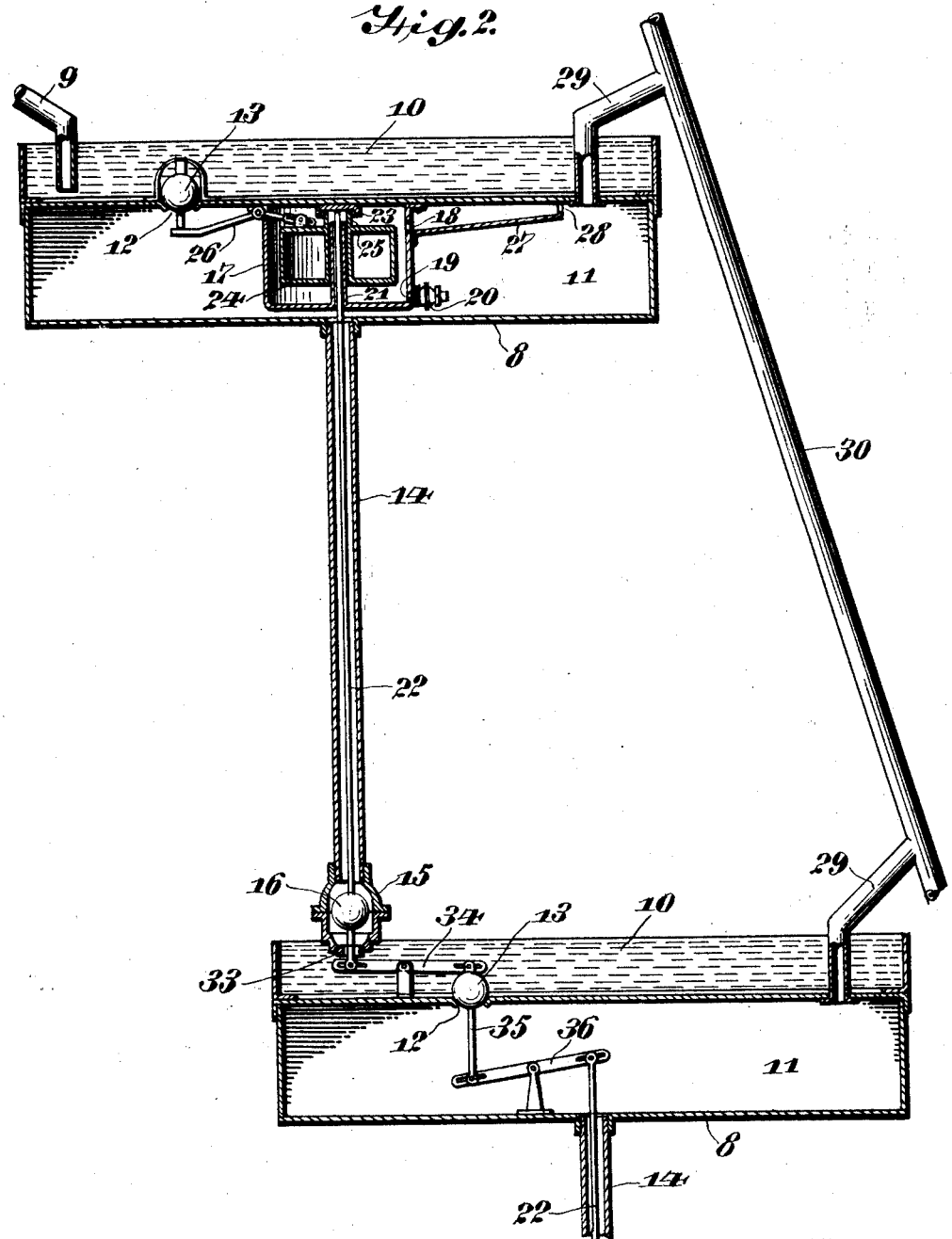
Fig. 2 is a side elevation, partly in cross section, of the highest vacuum producing element of the series of vacuum producing elements in connection with the succeeding lower vacuum producing element of said series.

The controlling mechanism of the vacuum producing elements operates as follows: Viewing Fig. 2 the upper open receptacles 10 have been filled with liquid, and the closed receptacles 11 have been evacuated of liquid through the outlet pipes 14. The liquid discharged from the higher receptacles 11 has passed on into the succeeding lower open receptacles 10. The liquid in the receptacle or float chamber 17, during the evacuation of the liquid from the receptacle 11 has been discharging through the outlet 19 and check valve 20 into the receptacle 11. The fall of the liquid in the chamber 17 causes a simultaneous fall of the float 24 therein, which permits the rod 22 with its cap 23 and valve 16, to descend, causing the pipe 14 to be closed at its lower end by the valve 16. At the same time the fall of the float 24 causes the outer end of the pivoted lever 26 to rise and raise the valve 13, which permits the liquid in receptacle 10 to flow into receptacle 11. When the liquid has risen to the level of the inlet 28 in the channel 27, it will pass into the channel 27 and thence through the inlet 18 into the chamber 17. As the liquid level rises in the chamber 17, the float 24 will rise correspondingly and the rising motion of the float will lower the extended portion of the lever 26, which will permit the valve 13 to close the outlet 12. The liquid which is stored in the channel 27, will continue to flow into the chamber 17, after the outlet 12 is closed, thus causing the float 24 to continue its rising movement. Subsequently, upon the further rising of the float 24, the projection 25 thereon, will engage the cap 23 and raise the rod 22 and valve 16. The water in the channel 27 continues to flow into the chamber 17 keeping the float and valve 16 raised until the liquid has been nearly exhausted from the receptacle 11. The outlet 19 is so restricted as to prevent the rapid discharge of the water or liquid from the chamber 17 and thus regulates the speed of the downward movement of the float so that the receptacle or chamber 11 will be entirely exhausted before the valve 16 is closed.

The fall of the float 24 and the corresponding fall of the rod 22 causes through the medium of the interlinkage 34, a rise of all the valves 13 and the rise of the valves 13 through the interlinkage 35 and 36 causes a fall of all the rods 22 with the closing of the outlet valves 16. The float 34 thus serves as a master control for the series of vacuum producing elements 8 and causes a simultaneous and similar operation in all these elements.

In the embodiment of my invention herein shown, I have made use of four lifting elements and five vacuum producing elements. In practice it will be found that the greater the number of vacuum producing elements that can be installed in a progressive series, the greater the volume of liquid will be which can be raised in the lifting elements. With this extra lifting capacity, it is possible to keep a supply of liquid in storage at the top of the mountain, which may be supplied from the highest receptacle 10 through the valve controlled outlet 32. This extra supply may be subsequently used to discharge at a lower level for power and other purposes, and also provides a constant source of liquid which may be utilized for priming purposes.

The height to which a liquid may be raised, is only limited by the amount of apparatus which it is desired to install. The level of the source from which liquid is taken will always be higher than the level at which the last vacuum producing element discharges. In practice it is desirable that the length of the pipes 14 exceeds the length of the pipes 7.

My invention may be applied to many uses, but it has special advantage in mountainous regions where it is desired to lift water over a mountain and discharge the same to lower regions for the purposes of irrigation or otherwise. The apparatus is simple, self-sustaining, automatic in operation and avoids the heavy expense involved in the usual methods of pumping by power. It has been found to effect a great saving where to transport water from one side of a mountain to another, it would be necessary to employ pumps of sufficient power and capacity to pump the water over the mountain or where resort would otherwise be had to the expensive method of tunneling through the mountain.

I have also found my invention very useful and efficient in connection with pumping in drift mines located in hilly or mountainous country. I have also found that in certain conditions where the fall on the other side of a hill or mountain is not sufficient to elevate water over the mountain from a very low position it is more economical to pump the water up to the proper height and then elevate it over the mountain by means of my apparatus.

Having described my invention, what I claim is—

1. In a device of the class described, a series of superimposed, interconnected receptacles, means utilizing a vacuum to successively transfer a liquid from a low level through each of said receptacles to a higher level, and means utilizing liquid thus elevated for producing said vacuum.

2. In a device of the class described, a series of superimposed, interconnected receptacles, means utilizing a vacuum to successively transfer a liquid from a low level through each of said receptacles to a higher level, and means utilizing liquid thus elevated in a series of vacuum producing elements to produce said vacuum.

3. In a device of the class described, a series of superimposed, interconnected receptacles, means utilizing a vacuum to successively transfer a liquid from a low level through each of said receptacles to a higher level, and means progressively utilizing liquid thus elevated in a series of progressively descending vacuum producing elements to produce said vacuum.

4. In a device of the class described, a series of superimposed, interconnected receptacles, means utilizing a vacuum to successively transfer a liquid from a low level through each of said receptacles to a higher level, and means utilizing liquid thus elevated in a series of vacuum producing elements to simultaneously produce a vacuum in said vacuum producing elements and in said series of interconnected receptacles.

5. In a device of the class described, a series of superimposed, interconnected receptacles, means utilizing a vacuum to successively transfer a liquid from a low level through each of said receptacles to a higher level, and means progressively utilizing liquid thus elevated in a series of progressively descending vacuum producing elements to produce a vacuum simultaneously in said vacuum producing elements and in said interconnected receptacles.

6. In a device of the class described, a series of superimposed interconnected receptacles, means utilizing a vacuum to successively transfer a liquid from a low level through each of said receptacles to a higher level, means for progressively utilizing liquid thus elevated in a series of progressively descending vacuum producing elements, in such a manner as to produce a vacuum simultaneously in said elements and interconnected receptacles and means for automatically controlling said simultaneous production of said vacuum.

7. In a device of the class described, a series of superimposed interconnected receptacles, means utilizing a vacuum to successively transfer a liquid from a low level through each of said receptacles to a higher level, a series of progressively descending vacuum producing elements, each having an open receptacle and a closed receptacle, means for transferring liquid from said high level into the open receptacle of the highest of said vacuum producing elements, means permitting said liquid in said open receptacle of the highest vacuum producing element to successively pass into the closed receptacle of the same vacuum producing element and thence into the open receptacle of the next lower vacuum producing element in such a manner as to produce a vacuum in said closed receptacles of said vacuum producing elements and means for connecting said closed receptacles of said vacuum producing elements with said interconnected receptacles so as to produce a vacuum therein.

8. In a device of the class described, a series of superimposed interconnected receptacles, means utilizing a vacuum to successively transfer a liquid from a low level through each of said receptacles to a higher level, a series of progressively descending vacuum producing elements, each having an open receptacle and a closed receptacle, means for transferring liquid from said higher level to the open receptacle of the highest of said vacuum producing elements, a conduit between said interconnected receptacles and said vacuum producing elements, means permitting said liquid in said open receptacle of the highest vacuum producing element to successively pass into the closed receptacle of the same vacuum producing element and thence into the open receptacle of the next lower vacuum producing element, in such a manner as to produce a vacuum in said closed receptacles of said vacuum producing elements, and means responsive to the liquid level in the closed receptacle of one of said vacuum producing elements to simultaneously control the passage of liquid from the open receptacles of all the said vacuum producing elements into the closed receptacles thereof.

9. In a device of the class described, a series of superimposed, interconnected receptacles, means utilizing a vacuum to successively transfer a liquid from a low level through each of said receptacles to a higher level, a series of progressively descending vacuum producing elements, each having an open receptacle and a closed receptacle, means for transferring liquid from said higher level to the open receptacle of the highest of said vacuum producing elements, a conduit between said interconnected receptacles and said vacuum producing elements, means permitting said liquid in said open receptacle of the highest vacuum producing element to successively pass into the closed receptacle of the same vacuum producing element, and thence into the open receptacle of the next lower vacuum producing element in such a manner as to produce a vacuum in said closed receptacles of said vacuum producing elements, and means responsive to the liquid level in the closed receptacle of one of said vacuum producing elements to simultaneously control the passage of liquid from the open receptacles of all of said vacuum producing elements into the closed receptacles thereof and from said closed receptacles into said open receptacles of all the succeeding vacuum producing elements.

10. In a device of the class described, a series of superimposed, interconnected receptacles, means utilizing a vacuum to successively transfer a liquid from a low level through each of said receptacles to a higher level, a series of progressively descending vacuum producing elements, each having an open receptacle and a closed receptacle, means for transferring liquid from said higher level to the open receptacle of the highest of said vacuum producing elements, a valved passage between said open and closed receptacles in each of said vacuum producing elements, a valved passage between each of said closed receptacles and the open receptacle of the next lower vacuum producing element, and means controlling the valves in said passages so as to permit the liquid in said open receptacle of the highest of said vacuum producing elements to pass from said open receptacle into the closed receptacle of the same vacuum producing element and thereafter into the open receptacle of the next lower vacuum producing element in such a manner as to produce a vacuum in the closed receptacles of said vacuum producing elements and means connecting said closed receptacles of said vacuum producing elements with said interconnected receptacles, so as to produce a vacuum therein.

11. In a device of the class described, a series of superimposed, interconnected receptacles, means utilizing an intermittently produced vacuum to successively transfer a liquid from a low level through each of said receptacles to a higher level, a series of progressively descending vacuum producing elements, means utilizing said raised liquid to intermittently produce a vacuum in said vacuum producing elements and means connecting said vacuum producing elements with said interconnected receptacles so as to produce an intermittent-vacuum therein.

12. In a device of the class described, a series of superimposed interconnected receptacles, means utilizing an intermittently produced vacuum to successively transfer a liquid from a low level through each of said receptacles to a higher level, a series of progressively descending vacuum producing elements, means utilizing said raised liquid to intermittently produce a vacuum in said vacuum producing elements, automatically operating means for controlling the intermittent production of said vacuum and means connecting said vacuum producing elements with said interconnected receptacles so as to produce an intermittent vacuum therein.

13. In a device of the class described, a series of superimposed interconnected receptacles, means utilizing an intermittently produced vacuum to successively transfer a liquid from a low level through each of said receptacles to a higher level, a series of progressively descending vacuum producing elements, each of said elements comprising an open receptacle and a closed receptacle, a valved passage between said open and closed receptacles, an outlet pipe having an outlet valve at the lower end thereof adapted to discharge liquid from said closed receptacle into the open receptacle of the next lower vacuum producing element, interconnected means for simultaneously operating all of the valves of all said vacuum producing elements in such a manner as to produce a vacuum in said closed receptacles and means for connecting said closed receptacles with said interconnected receptacles so as to produce an intermittent vacuum therein.

14. In a device of the class described, a series of superimposed, interconnected receptacles, means utilizing an intermittently produced vacuum to successively transfer a liquid from a low level through each of said receptacles to a higher level, a series of progressively descending vacuum producing elements, each of said elements comprising an open receptacle and a closed receptacle, a valved passage between said open and closed receptacles, an outlet pipe having an outlet valve at the lower end thereof adapted to discharge liquid from said closed receptacle into the open receptacle of the next lower vacuum producing element, a liquid level responsive device located in the closed receptacle of the highest of said vacuum producing elements, interconnected means connected therewith for simultaneously operating all of the valves of all said vacuum producing elements in such a manner as to intermittently produce a vacuum in said closed receptacles and means for connecting said closed receptacles with said interconnected receptacles so as to produce an intermittent vacuum therein.

15. In a device of the class described, a series of superimposed, interconnected receptacles, means utilizing a vacuum to successively transfer a liquid from a low level through each of said receptacles to a higher level, a series of progressively descending vacuum producing elements, a conduit between said interconnected receptacles and said vacuum producing elements, each of said elements comprising an open receptacle and a closed receptacle, a valved passage between said open and closed receptacles, an outlet pipe having an outlet valve at the lower end thereof adapted to discharge liquid from said closed receptacle into the open receptacle of the next lower vacuum producing element, a liquid level responsive device located in the closed receptacle of the highest of said vacuum producing elements, valve operating mechanism actuated by said device for operating the valve between the open and closed receptacles of the highest of said vacuum producing elements, valve operating mechanism actuated by said device for actuating said outlet valve in said outlet pipe, means connecting said outlet valve with the valve in the passage between the open and closed receptacles of the next lower vacuum producing element for operating the same, means connecting said valve in said passage of said lower vacuum producing element to the outlet valve in the outlet pipe of said lower vacuum producing element for operating said outlet valve and means connecting said last named outlet valve with the valve between the open and closed receptacles of the succeeding lower vacuum producing element so as to operate the same together with similar interconnected valve operating means and valves of the successfully lower vacuum producing elements.

16. In a device of the class described, a series of superimposed, interconnected receptacles, means utilizing a vacuum to successively transfer a liquid from a low level through each of said receptacles to a higher level, a series of progressively descending vacuum producing elements, a conduit between said interconnected receptacles and said vacuum producing elements, each of said elements comprising an open receptacle and a closed receptacle, a valved passage between said open and closed receptacles, an outlet pipe having an outlet valve at the lower end thereof adapted to discharge liquid from said closed receptacle into the open receptacle of the next lower vacuum producing element, a liquid level responsive device located in the closed receptacle of the highest of said vacuum producing elements, a lever actuated thereby for operating the valve between the open and closed receptacles of the highest of said vacuum producing elements, a rod extending through said outlet pipe connected to said outlet valve, means for actuating said rod by said liquid level responsive device, a pivoted lever located in the open receptacle of the next lower vacuum producing element, a pivoted connection between said lever and the end of said rod, a pivoted connection between said lever and the valve between the open and closed receptacles of said lower vacuum producing element, a pivoted lever located in said closed receptacle of said lower vacuum producing element, a rod connection to said last named valve, having a pivoted connection with said last named lever, a rod having a pivoted connection with said last named lever connected to the outlet valve of said lower vacuum producing element, extending through the outlet pipe thereof and connected to similar interconnected valve operating mechanism of the successively lower vacuum producing element so as to cause simultaneous operation thereof.

In testimony whereof I affix my signature.

REA D. LENTZ.